US010454870B2

(12) United States Patent
Dyor

(10) Patent No.: US 10,454,870 B2
(45) **Date of Patent: *Oct. 22, 2019**

(54) LOCATION-BASED NOTIFICATION

(71) Applicant: Microsoft Technology Licensing, LLC, Redmond, WA (US)

(72) Inventor: Matthew Graham Dyor, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 410 days.

This patent is subject to a terminal disclaimer.

(21) Appl. No.: 15/445,880

(22) Filed: Feb. 28, 2017

(65) Prior Publication Data

US 2017/0171130 A1 Jun. 15, 2017

Related U.S. Application Data

(60) Continuation of application No. 14/305,956, filed on Jun. 16, 2014, now Pat. No. 9,608,955, which is a (Continued)

(51) Int. Cl.
*G06F 15/16* (2006.01)
*H04L 12/58* (2006.01)
(Continued)

(52) U.S. Cl.
CPC ......... *H04L 51/20* (2013.01); *G06Q 10/0631* (2013.01); *H04L 51/24* (2013.01); *H04L 67/18* (2013.01)

(58) Field of Classification Search
CPC ................................ H04L 51/20; H04L 51/24
See application file for complete search history.

(56) References Cited

U.S. PATENT DOCUMENTS 6,999,565 B1 2/2006 Delaney et al.
7,202,801 B2 * 4/2007 Chou .................... G06Q 10/10 340/991

(Continued)

OTHER PUBLICATIONS

Bhatia, et al., “VTAssist—A Location-Based Feedback Notification System for the Disabled”, ACM, In the Proceedings of the 44th Annual Southeast Regional Conference, Session: Agents, Interactions and Mobility II, 2006, pp. 512-517.

(Continued)

*Primary Examiner* — Bryan Lee
(74) *Attorney, Agent, or Firm* — Drinker Biddle & Reath LLP

(57) ABSTRACT

Location-based notification includes establishment of a rally point and subsequent notification of a user when another user enters the rally point. Senders may set up rally points at various physical locations and specify one or more target recipients that are to be notified when the sender enters the rally point. Target recipients may specify communication settings that dictate whether and/or how they wish to receive notifications under a variety of circumstances. When a sender having a computing device enters a rally point location, a notification is sent from the computing device to a location-based notification service, which notifies each of the target recipients in a manner that complies with the target recipient's individual communication settings.

20 Claims, 8 Drawing Sheets

100
Rally Point 104
106
Sender 102
Rally Point Request 108
Location-Based Notification Service 110
VoIP Server 120
SMS/MMS Server 122
Email Server 124
Invite 114
Reject 116
Accept 116
Target Recipient 112A
Target Recipient 112B
Target Recipient 112C
Target Recipient 112D

Related U.S. Application Data division of application No. 12/725,402, filed on Mar. 16, 2010, now abandoned.

(51) Int. Cl.

| | |
|---|---|
| ***G06Q 10/06*** | (2012.01) |
| ***H04L 29/08*** | (2006.01) |

(56) References Cited

U.S. PATENT DOCUMENTS

| | | | | |
|---|---|---|---|---|
| 7,219,303 | B2 | 5/2007 | Fish | |
| 8,516,514 | B2 | 8/2013 | Belz et al. | |
| 2002/0161756 | A1 | 10/2002 | Fesq et al. | |
| 2003/0222765 | A1* | 12/2003 | Curbow ............... | G06Q 10/109 340/309.7 |
| 2004/0203852 | A1 | 10/2004 | Janakiraman | |
| 2005/0143097 | A1* | 6/2005 | Wilson .................. | H04W 64/00 455/456.3 |
| 2006/0058948 | A1 | 3/2006 | Blass et al. | |
| 2007/0237096 | A1 | 10/2007 | Vengroff et al. | |
| 2007/0281716 | A1 | 12/2007 | Altman et al. | |
| 2008/0032703 | A1 | 2/2008 | Krumm et al. | |
| 2009/0170531 | A1 | 7/2009 | Hampel et al. | |
| 2009/0192645 | A1 | 7/2009 | Gudipaty et al. | |
| 2009/0192845 | A1* | 7/2009 | Gudipaty ............... | G06Q 10/10 705/7.19 |
| 2010/0274855 | A1* | 10/2010 | Wassingbo ........... | G06Q 10/109 709/206 |
| 2011/0012734 | A1 | 1/2011 | Reese et al. | |
| 2011/0087510 | A1 | 4/2011 | Putra et al. | |
| 2011/0111728 | A1 | 5/2011 | Ferguson et al. | |
| 2011/0167357 | A1 | 7/2011 | Benjamin et al. | |
| 2014/0297773 | A1 | 10/2014 | Dyor | |

OTHER PUBLICATIONS

Decker, “Generalized Notification Services: A Simple but Versatile Paradigm for the Implementation of Mobile Data Services”, In the Proceedings of the Second European Mobile Government Conference, Mobile Government Consortium International Publications, 2006, Available at <<http://www.mgovernment.org/resurces/euromgvo2006/PDF/10_Decker.pdf>> 10 pgs.

Foursquare—Get foursquare on your phone! retrieved on Jan. 6, 2010, at <<http://www.foursquare.com/learn_more>>, 2 pages.

Foursquare, retrieved on Jan. 6, 2010 at <<http://www.foursquare.com/>>, 1 page.

Loopt—Discover the world around you, retrieved on Jan. 6, 2010, at <<http://www.lopt.com/>>, 4 pages.

Loopt—Partners & Products, retrieved on Jan. 6, 2010 at <<http://www.loopt.com/about/partners-products>>, 6 pages.

Office action for U.S. Appl. No. 12/725,402, dated Jan. 16, 2014, Dyor, et al., “Location-Based Notification”, 21 pages.

Office action for U.S. Appl. No. 14/305,956, dated Oct. 25, 2016, Dyor, “Location-Based Notification”, 13 pages.

Office action for U.S. Appl. No. 12/725,402, dated Nov. 20, 2012, Dyor, “Location-Based Notification”, 21 pages.

Office action for U.S. Appl. No. 12/725,402, dated May 16, 2013, Dyor, “Location-Based Notification”, 19 pages.

Office action for U.S. Appl. No. 12/725,402, dated Jul. 20, 2012, Dyor, “Title of Application”, 14 pages.

* cited by examiner

LOCATION-BASED NOTIFICATION

CROSS-REFERENCES TO RELATED APPLICATIONS

This application claims priority to and is a continuation of U.S. patent application Ser. No. 14/305,956, entitled "Location-Based Notification," filed Jun. 16, 2014, which claims priority to and is a divisional of U.S. patent application Ser. No. 12/725,402, entitled Location-Based Notification, filed Mar. 16, 2010, the entire contents of which are incorporated herein by reference.

BACKGROUND

With the proliferation of communication devices and systems, people have multiple communication channels by which they can be reached and by which they can reach their contacts. Although these multiple communication channels provide great flexibility, this flexibility comes at the cost of simplicity. For example, if a person (e.g., the sender) wants to meet another group of people, he has to determine which of the multiple communication channels will be effective to reach each of the intended recipients, each of whom may be reachable by a different channel. Alternatively, he can set up plans well in advance, knowing that over time each of the people invited to a gathering (e.g., the targets) is likely access a communication channel (e.g., email) by which the invitation was provided. That is, if the sender sends an email to a group of contacts a week in advance of a planned meeting, it is likely that all of the contacts will access their email accounts during the week regardless of whether the invitation is sent to their personal, work, or other email address.

For certain types of people and for certain types of meetings, however, there is no single effective, efficient, and acceptable communication channel. For example, if a parent wants to notify other parents that his family is at the park, for example, he can email the other parents. This technique is efficient for the sender but may not succeed in notifying the targets in a timely manner A series of phone calls, on the other hand, may be more effective at notifying the targets, but it is not efficient for the sender and it may be unwanted by the target (e.g., a target may be at work, eating dinner, disinterested in meetings at a particular location, or otherwise not interested in the phone call).

Existing social networking and location tracking services fail to provide appropriate notifications in a manner that reliably gains the target's attention.

BRIEF SUMMARY

This Summary is provided to introduce simplified concepts for location-based notification, which are further described below in the Detailed Description. This summary is not intended to identify essential features of the claimed subject matter, nor is it intended for use in determining the scope of the claimed subject matter. This disclosure relates to location-based notification. Generally, location-based notification includes establishment of a potential meeting location or "rally point" and subsequent notification of a user when another user enters the rally point.

For example, senders may set up rally points at various physical locations and specify one or more intended recipients or "target recipients" that are to be notified when the sender enters the rally point. Target recipients may specify communication settings that dictate whether and/or how they wish to receive notifications under a variety of circumstances. When a sender having a computing device enters a rally point location, a notification is sent from the computing device to a location-based notification service, which notifies each of the target recipients in a manner that complies with his or her individual communication settings.

In another example, a location-based notification service may monitor locations of multiple users over time and propose a rally between the multiple users at a location at which the multiple users have met in the past. The proposals may, for example, be automatically generated after passage of a predetermined amount of time since a last meeting, or may be generated at the request of one or more users.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As noted above, it is often difficult to notify parties of opportunities to meet in a way that is efficient for the scheduling party and effective to get the attention of target recipients. This difficulty is compounded by the fact that the target recipients may not care to receive certain types of notifications and/or may not be interested in being notified of certain opportunities (e.g., if they are at work, eating dinner, disinterested in meetings at a particular location, or otherwise not interested).

This disclosure describes location-based notification that allows senders to establish potential meeting locations or rally points at various physical locations and to specify one or more target recipients (user(s) and/or group(s)) that are to be notified when the sender enters the rally point. Target recipients may specify communication settings that dictate whether and how they wish to receive communications (e.g., via email, text message, voice message, or multimedia message), including filters based on rally point, sender, people with the sender, time of day, and/or status of the target recipient. At a later time (e.g., next day, next month), when a sender having a computing device enters a rally point location, a notification is sent from the computing device to a location-based notification service, which notifies each of the target recipients in a manner that complies with his or her individual settings. Thus, senders are able to easily convey opportunities to meet in a way that is effective to alert interested target recipients of the opportunity.

Illustrative Location-Based Notification Environment

Figure 1:
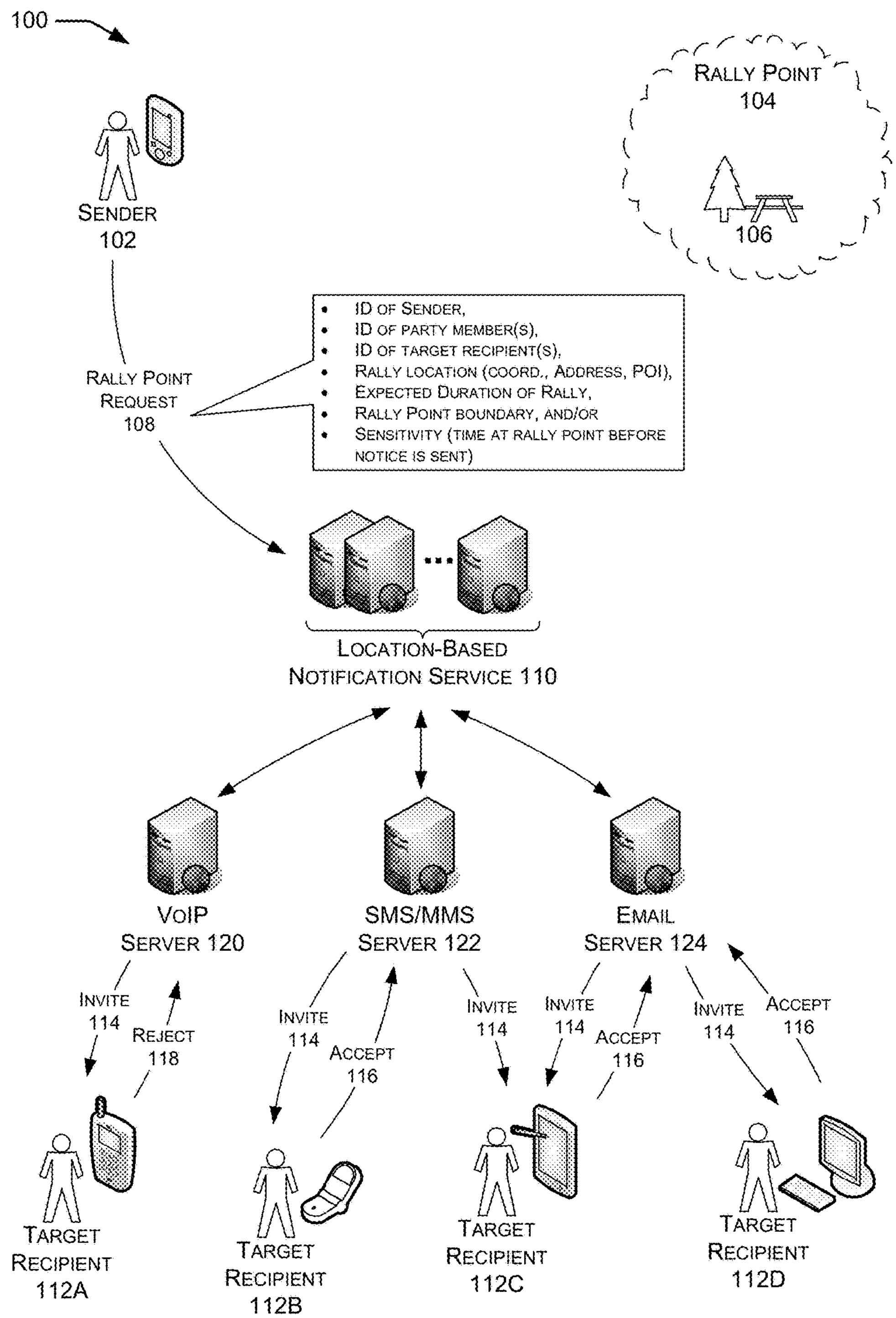
FIG. 1 is a schematic diagram of an illustrative environment usable to establish rally points for location-based notification.
Figure 2:
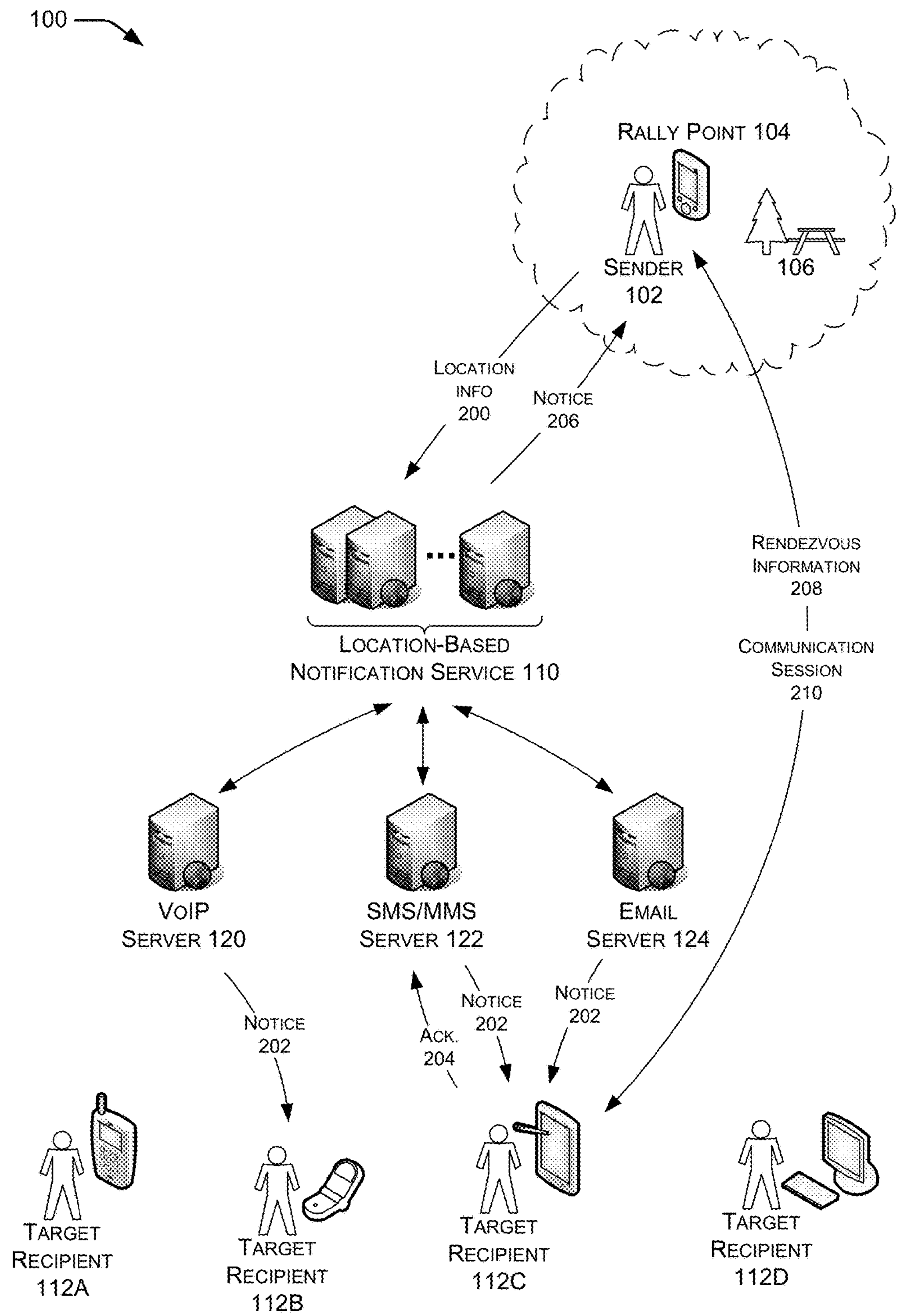
FIG. 2 is a schematic diagram of the environment of FIG. 1, showing notification of target recipients when a sender enters a rally point.

FIGS. 1 and 2 are schematic diagrams of an illustrative environment 100 usable to implement location-based notification. Specifically, FIG. 1 illustrates establishment of rally points and FIG. 2 illustrates subsequent notifications based on the rally points. The various computing devices, services, and servers shown in FIGS. 1 and 2 are communicatively coupled by a wired and/or wireless communication network (not shown). By way of example and not limitation, the communication network may include the Internet, one or wide area networks (WANs), local area networks (LANs), and/or personal area networks (PANs), and the various components of FIG. 1 may be coupled to the communication network using known communication connections and protocols.

Referring to FIG. 1, a sender 102 uses a computing device to establish a rally point 104 at a physical location—in this case a park 106—by sending a rally point request 108 to a location-based notification service 110. The rally point request 108 includes information usable by the location-based notification service 110 to establish a rally point, such as an identification of the sender, one or more target recipients 112A-112D (collectively 112) that are to be notified of the rally point, and a location of the rally. The identification of the sender 102 may include a name of the sender, a username the sender uses to log in to the location-based notification service, an email address of the sender, a telephone number of the sender, an identifier of a computing device associated with the sender in a user profile of the sender, or any other information usable to identify the sender of the rally point request 108. Any of the types of identifying information listed above for the sender 102 may also be used to identify the target recipients 112. The location of the rally point may be given by geographical coordinates of the location (e.g., longitude and latitude), a street address, and/or a point of interest (e.g., "central park" or a unique identifier that corresponds to the "central park" location). In some embodiments, the rally point request 108 may additionally or alternatively include, for example, an identification of party members that are likely to accompany the sender to the rally point, an expected duration of the rally, a radius or other boundary of the rally point, and/or a sensitivity of the rally point (e.g., an amount of time at the rally point before a notification is sent).

Once the rally point 104 is established, the rally point request 108 (or the information contained within it) may be stored in a rally point database of the location-based notification service 110. The location-based notification service 110 then sends invitations 114 to the target recipients 112 to subscribe to the rally point. The invitations 114 may be sent in accordance with communication settings specified in user profiles of the target recipients. The communication settings may dictate whether and how (e.g., email, text message, voice message, or multimedia message) notifications are to be received. User profiles may also specify different communication settings to be applied based on type of communication (e.g., invitation vs. notification), rally point, sender, people with the sender, time of day, status of the target recipient, or the like. General communication settings may be stored in a profile database at the location-based notification service 110, locally on a computing device of the user (sender or target recipient, respectively), or both. In some embodiments, temporary communication settings (e.g., a "do not disturb" setting) may augment or modify general communication settings.

If a target recipient 112 has not established communication settings and/or is not a member of the location-based notification service 110, the invitation 114 may be sent using a default communication mode (e.g., email), and may include a prompt or link for the target recipient 112 to create an account, activate an account, and/or establish/manage communication settings with location-based notification service 110 and/or to establish communication settings.

Upon receiving the invitation 114, a target recipient 112 may subscribe to the rally point by sending an acceptance 116. The acceptance may include updated profile information for the target recipient 112. In the event that the target recipient 112 was not previously a member of the location-based notification service 110, the acceptance 116 may include account creation information, user profile information, and/or communication settings. A target recipient 112 may choose not to subscribe to the rally point, and consequently not receive any notifications relating to the rally point, by sending a rejection 118 of the invite or ignoring the invite.

In the example shown in FIG. 1, communication settings for the target recipients specify that target recipient 112A is to receive rally invitations as voice calls placed to a home telephone number, target recipient 112B is to receive rally invitations as voice calls placed to a mobile telephone number, target recipient 112C is to receive rally invitations as text messages to a mobile telephone number and as emails, and target recipient 112D is to receive rally invitations as emails. Based on these communication settings, a rules engine of the location-based notification service 110 directs a voice over internet protocol (VoIP) server 120 to send an invitation 114 to a home telephone number of target recipient 112A in the form of a recorded voice message. The rules engine directs a simple message service (SMS) and/or multimedia message service (MMS) server 122 to send invitations 114 to mobile telephone numbers of target recipients 112B and 112C in the form of text messages or multimedia messages. The rules engine also directs an email server 124 to send email invitations 114 to email addresses of target recipients 112C and 112D.

Target recipients 112B, 112C, and 112D each subscribe to the rally point by sending acceptances 116 of the respective invitations 114. Target recipient 112A, however, declined the rally point by sending a rejection 118 of the invite 114.

FIG. 2 illustrates the environment 100 at a time subsequent to that shown in FIG. 1. As shown in FIG. 2, the sender 102 has moved toward the park 106 and has entered the rally point 104. A computing device of the sender 102 sends location information 200 to the location-based notification service 110. The location information 200 may be sent automatically by the computing device (e.g., periodically or in response to movement of the computing device), manually at the request of the sender 102, or semi-automatically after requesting approval of the sender 102. Regardless of the location publication settings, before any location information is sent for a first time, the sender may be asked for affirmative consent to provide the information before the data is collected (e.g., during account set up, upon startup of an application, at a first instance of publication, etc.). The same consent may be obtained from target recipients as well.

Upon receiving the location information 200, location-based notification service 110 compares the current location of the sender 102 to locations of rally points with which the sender 102 is associated, and determines that the sender 102 has entered the rally point 104. Alternatively, the determination that the sender 102 has entered the rally point 104 may be made locally by the sender's mobile device. In that case, the location information 200 may include an affirmative indication that the sender 102 has entered the rally point 104. Again, the location information 200 may be sent automatically (e.g., in response to the mobile device determining that it has entered a rally point location and/or the sender's mobile device periodically sending location updates), manually (e.g., by a sender selectively publishing his location), or semi-automatically (e.g., by presenting the sender with an option to initiate a notification and providing default information based on information the user specified in the rally point request). In addition to or instead of the automatic, manual, and semi-automatic location updates to the location-based notification service 110, the sender may activate a rally point manually (e.g., independent of location information). For example, a sender may manually activate a rally point using a mobile device that cannot provide or cannot efficiently determine location information, or a sender may want to activate and/or propose a rally point at a location different than the sender's current location. The sender 102 may also provide additional information, such as confirming or modifying the default information (e.g., duration of visit, people with the sender, attaching a recorded voice and/or video message, etc.).

The location-based notification service 110 then determines which target recipients should be notified. For example, the location-based notification service 110 may query a database to determine which users have subscriptions to a rally point owned by the sender 102 having a location corresponding to the sender's present location and/or manually activated by the sender. For automated and semi-automated notifications, the sender's mobile device and/or the location-based notification service 110 may wait a predetermined time (e.g., the sensitivity period) before initiating/prompting for a notification to prevent a notification from being sent or the sender being prompted as the sender is passing through a rally point location. The location-based notification service 110 then proceeds to determine whether (yes or no) and how (using what communication mode) to notify the target recipients 112 subscribed to the rally point 104 based on their respective communication settings for notifications (which may or may not be the same as their communication settings for invitations).

In the example shown in FIG. 2, target recipient 112A does not receive a notification since he rejected the invitation 114 in FIG. 1. Target recipient 112B receives a notification 202 at her mobile device from VoIP server 120, which is a different mode of communication than the text message invite 114 she received from the SMS/MMS server 122. Target recipient 112C receives text message and email notifications 202 from SMS/MMS server 122 and email server 124, respectively. Target recipient 112D also does not receive a notification, since she is in a meeting and her communication settings specify that she does not care to receive notifications while in meetings. Thus, even though she accepted the invite 114, the location-based notification service 110 will not send target recipient 112D a notification while she is in the meeting. The location-based notification service 110 may notify target recipient 112D when the meeting ends and may take into account various parameters, including the remaining duration of the visit, whether the location-based notification service 110 has determined that people have arrived and/or remain at the location, or other parameters.

After receiving the notice 202 of the rally, each of the target recipients 112 may "activate" the rally point with respect to the target recipient by, for example, sending an acknowledgement 204 of the rally notification, entering the rally point, and/or traveling toward the rally point. The sender 102 may receive a notification 206 when a rally point becomes active for the target recipient. Once a rally point is active, the location-based notification service 110 may facilitate sharing of rendezvous information 208 between the sender 102 and a target recipient 112 (e.g., target recipient 112C in FIG. 2) to help the users locate one another at the rally point 104. Examples of rendezvous information 204 include, without limitation, compass information, a directional arrow pointing in the direction of the other user, a distance separating the users, a photograph of the user and/or surroundings, a map that depicts the location of the sender and the target recipients who have activated the rally point. Additionally or alternatively, a map may be provided of the sender and all target recipients who have acknowledged a rally point request, are at the rally point, or are en route to the rally point. The foregoing rendezvous information may be provided or enhanced through the use of global positioning satellite (GPS) data, WiFi signals, Bluetooth® signals, and/or other signals that may be used to determine, estimate, or predict location of the sender and target recipients and/or the sender and/or target recipient devices. Additionally or alternatively, the location-based notification service 110 may establish a communication session 210 (e.g., phone call, video chat, instant message session, etc.) between the sender 102 and the target recipient 112 to further aid the users in locating one another. The location-based notification service 110 may prompt the sender 102 to establish the call, may prompt the target recipient 112 to initiate the call, or may automatically initiate the call to both parties.

Illustrative Client Device

Figure 3:
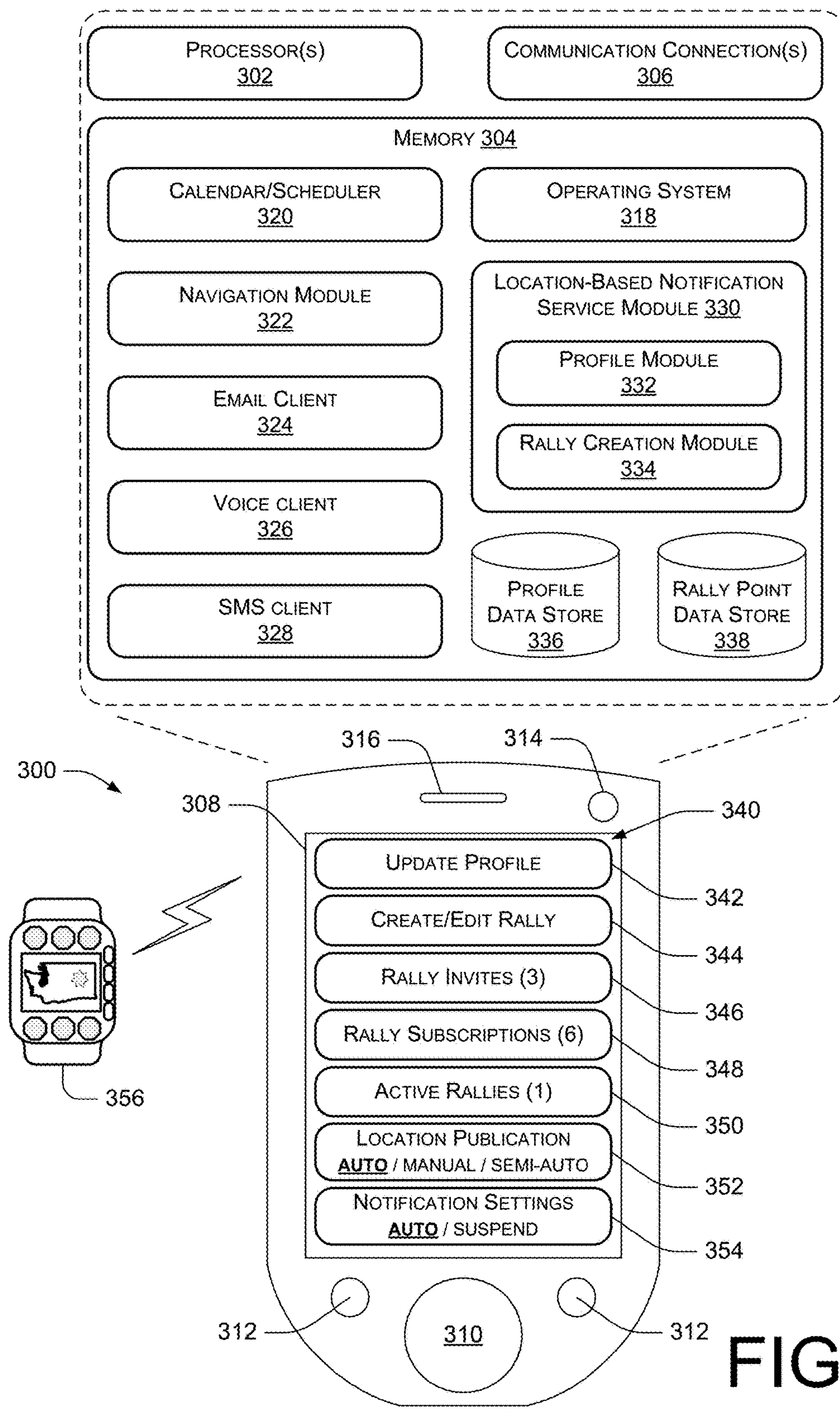
FIG. 3 is a block diagram of an illustrative client device usable to interact with a location-based notification service, as well as an illustrative user interface of the client device.

FIG. 3 is a block diagram of an illustrative client device 300 that may be used to interact with a location-based notification service, such as the location-based notification service 110 of FIGS. 1 and 2. The client device 300 is illustrative of devices used by senders 102, target recipients 112, and any other users of a location-based notification service. The client device 300 may be configured as any suitable computing device capable of interacting with and/or partially implementing a location-based notification service. By way of example and not limitation, suitable computing devices may include personal computers (PCs), laptops, mobile telephones, home telephones, personal data assistants (PDAs), tablet PCs, set top boxes, or any other device capable of interacting with and/or partially implementing a location-based notification service.

In one illustrative configuration, the client device 300 comprises a processor 302 and memory 304. Memory 304 may store program instructions that are loadable and executable on the processor 302, as well as data generated during or used in connection with execution of these programs.

The client device 300 may also contain communications connection(s) 306 that allow the client device 300 to communicate with the location-based notification service 110 and/or other client devices on the network. The client device 300 may also include input devices, such as a keyboard, mouse, pen, voice input device, touch input device, etc., and output devices, such as a display, speakers, printer, etc.

coupled communicatively to the processor and memory. In the Example shown in FIG. 3, the client device 300 includes a touch screen display 308 which serves as both an input and an output, a thumb pad 310 input, a pair of input buttons 312, a camera 314, and a speaker 316.

Turning to the contents of the memory 302 in more detail, the memory 302 may include an operating system 316, a calendaring or scheduling application 320, and a navigation module 322. The calendaring or scheduling application 320 may contain data and time information, event information, and/or schedule information of a user of the client device 300. The navigation module 322 may include mapping software, GPS navigation capabilities in combination with a GPS antenna (not shown), a compass, and various other navigation functionalities. The memory 302 may also include an email client 324, a voice client 326, and a text/multimedia messaging client 328, to implement email, voice communications, and text/multimedia messaging, respectively.

The memory 302 also includes a location-based notification service module 330, which provides an interface with the location-based notification service 110. The location-based notification service module 330 may merely provide an interface by which a user of the client device 300 can interact with the location-based notification service 110, or it may include some of the functionality to implement that service. In the embodiment shown in FIG. 3, the location-based notification service module 330 includes a profile module 332 and a rally creation module 334. The profile module 332 includes logic to allow a user to update his or her profile information stored in a local profile data store 336 and/or remotely in a profile database of the location-based notification service 110. The rally creation module 334 includes logic to allow a user to establish, edit, and manage rally points, and to store the rally points in a local rally point store 338 and/or a remote rally point database of the location-based notification service 110.

The location-based notification service module 330 further is configured to present a user interface 340 on the touch screen display 308. The user interface 340 presents a "user profile" control 342 that allows a user to update their user profile information via the profile module 332, and a "create/edit rally" control 344 that allows the user to establish, edit, and manage rally points via the rally creation module 334. The user interface 340 also includes a "rally invites" control 346 that shows a number of received rally invites (in this case three) to which the user has not yet responded, a "rally subscriptions" control 348 that shows a number of rallies to which the user is subscribed (in this case six), and an "active rallies" control 350 that shows a number of active rallies that the user is currently participating in (in this case one). User selection of any of controls 346-350 results in display of a list of the respective rallies and additional details of each (e.g., sender, target recipients, duration, location, directions, etc.).

The user interface 340 further includes a "location publication" control 352, which allows a user to control publication of his or her location information. For example, the user can set the location publication control 340 to automatically publish location information periodically, in response to a change in location, or according to any other publication scheme. Alternatively, the user can set the publication control 340 to semi-automatic mode in which the user is prompted before the user's location is published, or the user can set the publication control 340 to a manual mode requiring manual user input to update the location. In the manual mode, a special purpose button may be designated to update the user's location with the location-based notification service 110. For example, in FIG. 3, one or both of buttons 312 may be designated as special purpose location update buttons. In another example, a predetermined, special purpose gesture (e.g., a swipe of a finger across location publication control 352) may be configured in addition to or instead of the special purpose button to update the location information. If a user does not provide automatic location updates, the user may push the location button or perform the special purpose gesture and a particular application or a set of applications or services (local or remote) may be provided with updated information. This information update may, for example, cause a rally to be initiated.

Still further, the user interface 340 may include a "notification" control 354 usable to temporarily suspend notifications (e.g., while in meetings or at the movies). The notification control 354 may be used to provide temporary communication settings, and the user may still update his or her general communication settings via the update profile control 342.

In addition to the inputs and outputs described above, one or more peripherals may be coupled to the client device 300 and may serve as additional inputs and/or outputs. In one specific embodiment, a watch 356 may be wirelessly coupled to the client device 300 to serve as a notification interface of the client device 300. For example, when a notification is received, the watch 356 may vibrate, make a sound and/or display a brief set of information about an ongoing rally (or suggest initiating or activating a rally). The watch 356 may also be used to reply to a notification (e.g., to respond that the target recipient is going to attend). The watch 356 may be part of a mobile communication system. For example, the watch 356 may work in combination with a mobile phone client device 300 via a wireless connection to form a wireless personal area network. In this embodiment, a button on the watch 356 may be used to initiate a rally, reply to a notification, or otherwise interact with the location-based notification service 110.

FIG. 3 illustrates an embodiment in which the location-based notification functionality is split between the client device 300 and the remote location-based notification service 110. However, in other embodiments, the location-based notification functionality may be implemented entirely by remote location-based notification service 110 (e.g., as a web services application), or may be implemented entirely by applications running on a plurality of peer-to-peer client devices.

Illustrative Location-Based Notification Service

Figure 4:
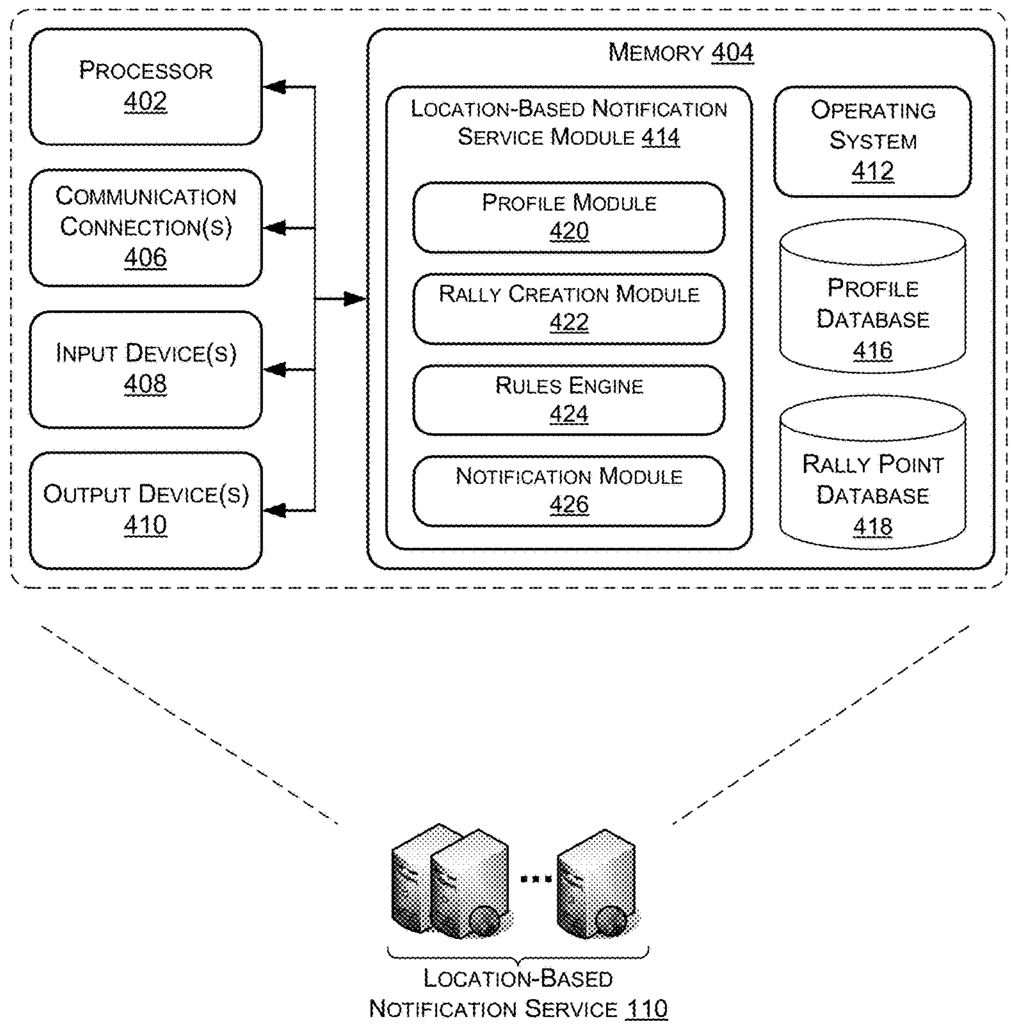
FIG. 4 is a block diagram of an illustrative system usable to implement a location-based notification service.

FIG. 4 is a block diagram of an illustrative system usable to implement a location-based notification service, such as the location-based notification service 110 of FIGS. 1 and 2. The location-based notification service 110 may be configured as any suitable computing device capable of implementing a location-based notification service. By way of example and not limitation, suitable computing devices may include personal computers (PCs), servers, server farms, datacenters, or any other device capable of storing and executing all or part of the location-based notification service.

In one illustrative configuration, the location-based notification service 110 comprises one or more processors 402 and memory 404. The location-based notification service 110 may also contain communications connection(s) 406 that allow the location-based notification service 110 to communicate with client devices and/or other devices on the network. The location-based notification service 110 may also include one or more input devices 408, such as a keyboard, mouse, pen, voice input device, touch input device, etc., and one or more output devices 410, such as a display, speakers, printer, etc. coupled communicatively to the processor and memory.

Depending on the configuration and type of computing device, memory 404 of the location-based notification service 110 and memory 304 of the client device 300 may include volatile (such as random access memory (RAM)) and/or non-volatile (such as read-only memory (ROM), flash memory, etc.). Memories 304 and 404 may also include additional removable storage and/or non-removable storage including, but not limited to, magnetic storage, optical disks, and/or tape storage that may provide non-volatile storage of computer readable instructions, data structures, program modules, and other data for the location-based notification service 110 and the client device 300, respectively.

Memories 304 and 404 are examples of computer-readable storage media. Computer-readable storage media includes, but is not limited to, volatile and non-volatile, removable and non-removable media implemented in any method or technology for storage of information such as computer-readable instructions, data structures, program modules or other data. In some examples, computer-readable media comprises non-transitory, tangible media. Additional types of computer-readable storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the location-based notification service 110 and the client device 300, respectively. Combinations of any of the above should also be included within the scope of computer-readable storage media.

Turning now to the information stored in memory 404, the memory 404 may store program instructions that are loadable and executable on the processor 402, as well as data generated during the execution of and/or usable in conjunction with these programs. In the illustrated example, memory 404 stores an operating system 412, a location-based notification service module 414, a profile database 416, and a rally point database 418. The location-based notification service module 414 further includes a profile module 420, a rally creation module 422, a rules engine 424, and a notification module 426. In distributed embodiments, the profile module 420 and the rally creation module 422 may serve as interfaces to communicate with counterpart modules 332, 334 of the client device 300. However, in purely web-based embodiments, the profile module 420 and rally creation module 422 may simply perform the functions of the described above for the profile module 332 and rally creation module 334, thereby obviating the need for the client side location-based notification service module entirely. In that case, the profile module 420 and the rally creation module 422 may be configured to render user interface screens such as user interface 340 in FIG. 3, and to serve those screens to a user via the network. The profile module 420 and rally creation module 422 would also include the backend functionality needed to create and edit user profile information and rally point information stored in the profile database 416 and rally point database 418.

The rules engine 424 controls flow of communications between senders and target recipients. For example, the rules engine 424 may query the rally point database 418 to determine which users have subscriptions to a rally point owned by the sender having a location corresponding to the sender's present location. The rules engine 424 may then query the profile database 416 to determine whether (yes or no) and by what communication channel (modality) the notification should be sent to the target recipients based on the target recipients' general and temporary communication settings. The notification module 426 then notifies each of the target recipients according to their individual communication settings.

Illustrative User Profile Information

Figure 5:
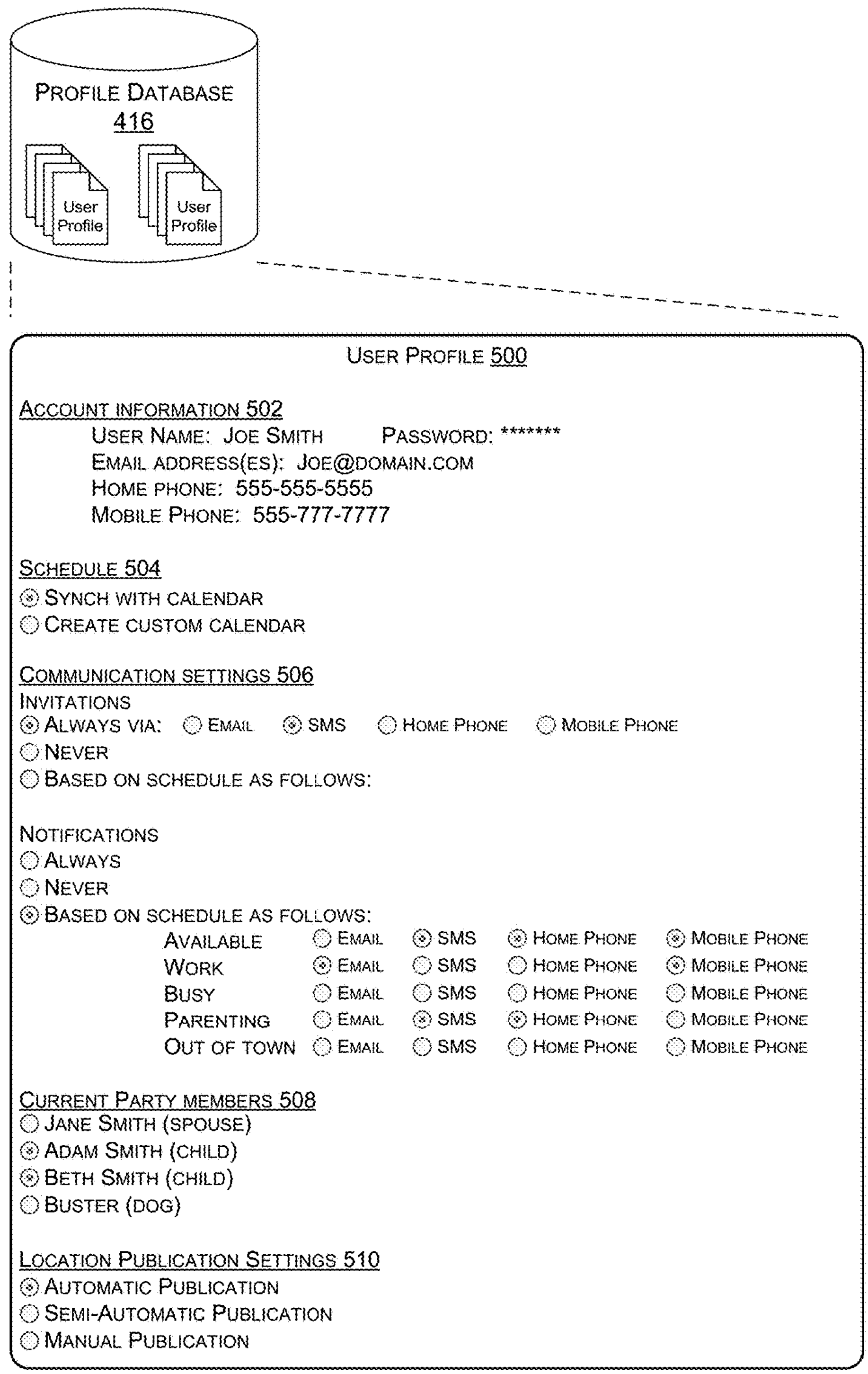
FIG. 5 is a schematic diagram of an illustrative user profile of a subscriber to a location-based notification service.

FIG. 5 is a schematic diagram of an illustrative user profile 500 of a subscriber to a location-based notification service. As shown in FIG. 5, user profile 500 is but one of many user profiles stored in the user profile database 416 of the location-based notification service 110. Some or all of user profile 500 may additionally or alternatively be stored in profile data store 336 of the client device 300. User profile 500 is typical of a sender user profile as well as a target recipient user profile. The user profile would typically be created at the time a user subscribed to the location-based notification service, and updated periodically thereafter.

As shown in FIG. 5, the user profile 500 includes account information 502, such as a username, password, email address(es), and telephone number(s) for the user.

The user profile 500 includes a schedule 504 designating the user's availability and status (e.g., free/busy, work, meeting, with family, out of town, etc.). The schedule 504 may allow a user to leverage an existing calendar or scheduling application by synching with the existing calendar or scheduling application, such as a calendar in Microsoft® Office Outlook®, available from Microsoft Corporation of Redmond, Wash., or a Google® calendar available from Google Inc. of Mountain View, Calif. This allows the user to keep all of his or her appointments in one location. The schedule 504 may also allow the user to create a custom calendar specific to the location-based notification service 110. The custom calendar may be specific to the user, or may be shared with one or more friends, family, coworkers, or other members of the user's social network.

The user profile 500 also includes communication settings 506, by which a user can manage when and how they want to receive invitations and notifications regarding rallies. In the illustrated embodiment, the communication settings 506 are shown divided into settings relating to invitations and settings relating to notifications. However, in other embodiments, these settings could be grouped together and/or other divisions could be provided (e.g., general settings and temporary settings). For each of the invitation and notification sections in FIG. 5, the user is given the option to choose to receive the respective communication "always," "never," or "based on schedule." Depending on which of those options the user selects, the user may be presented with additional options. For example, once the user selected to "always" receive invitations, the user is presented with an option to select the desired mode(s) of communication by which the user wishes to receive the invitations (in this case SMS text messages). For notifications, the user has selected to receive notifications "based on schedule," which presents the user with a list of status identifiers. The user is then able to select whether and how notifications should be delivered for each of the listed status identifiers.

For example, if a target recipient is in a "busy" or "out of town" status, no outgoing and/or incoming notification may be sent by or to the target recipient. If the target recipient is in a "work" status, the communication settings may specify that notifications are to be sent to a work email address and a mobile phone, while if the target recipient is in a "parenting" status, the communication settings may specify that notifications are to be sent to a home phone and/or mobile device number. If the target recipient is in "available" status, the location-based notification service 110 may determine the appropriate communication channel by which to communicate with the user. While not shown in FIG. 5, the appropriate communication channel, may be further defined by the general communication settings, and may be time dependent (e.g., between 6:00 and 7:00, the target wants to be called, otherwise the target prefers to be emailed), rally point specific (e.g., the target prefers to be called for certain rally points and emailed for other rally points), sender specific (e.g., the target recipient prefers to be called by certain senders and emailed by other senders), pattern specific (e.g., the target recipient prefers to be called for senders that the target has not rallied with in a predetermined amount of time, such as a month, and emailed for senders that the target has seen within the predetermined amount of time), size specific (e.g., the target recipient only wants notifications when two or more or of his or her friends are present), distance specific (e.g., do not notify a target recipient if the target recipient is not able to get to the location before the rally ends), and/or dependent upon other factors.

Furthermore, certain circumstances may override the general communication settings. For example, a hyper-rally may be a notification initiated after a certain number of principals (e.g., owners of rally points to which the target has subscribed, target recipients of an active rally point, or combinations thereof, etc.) are indicating that they are travelling to and/or at a rally point location. For example, if a target having a hyper-rally threshold of two principals has indicated that he is busy he may not receive a first notification that a first principal has entered a rally point location. However, if a second principal sends a notification that he has also entered the rally point location, the hyper-rally threshold is met and the target may receive a notification despite the fact that the target's status is busy.

In addition to the general communication settings 506 shown in FIG. 5, a user may have temporary communication settings. For example, a sender may temporarily stop generating automated (or being prompted to generate semi-automated) notifications for a predetermined period of time after the sender sets a "suspend publishing" option. Similarly, a target may stop receiving notifications for a predetermined period of time after the sender sets a "suspend subscriptions" option. These temporary communication settings may override all other communication settings, although a target may still be able to communicate directly with the sender without using the location-based notification service 110. Temporary communication settings, when present, may be shown as another category of communication settings.

The user profile 500 also includes a list of current party members 508 that are with the user. An aspect of the location-based notification service 110 is that some people may not have a mobile computing device (e.g., a cell phone). For example, a child may not have a cell phone. However, the presence of the child changes the types of communications that a person may want to receive. For example, two fathers may play tennis periodically, sometimes with children and sometimes without children. Providing the information in a notification about whether the sender's children are present provides the target recipient with a better understanding of the situation. The presence or absence of children can also be used to influence communication settings. For example, if a parent has specified or the location-based notification service 110 has detected that he is in "parenting" status, notifications that specify children are not present could be treated differently (e.g., not delivered or delivered via a lower attention communication channel) than notifications that specify that children are present.

The user profile 500 may also include location publication settings 510, which indicate whether and how a user's location should be published to the location-based notification service 110 and to other users. As discussed above, location publication can be performed automatically without user input, semi-automatically after prompting a user for approval to publish the location, or manually in response to a user request to publish current location information. In various implementations, publication of location information can be initiated by the client device 300 ("push publication") or the location-based notification service 110 ("pull publication"). Depending on the type of location publication employed, the location publication settings 510 may be stored at the client device 300, the location-based notification service 110, or both.

Illustrative Location-Based Notification System Flow

Figure 6:
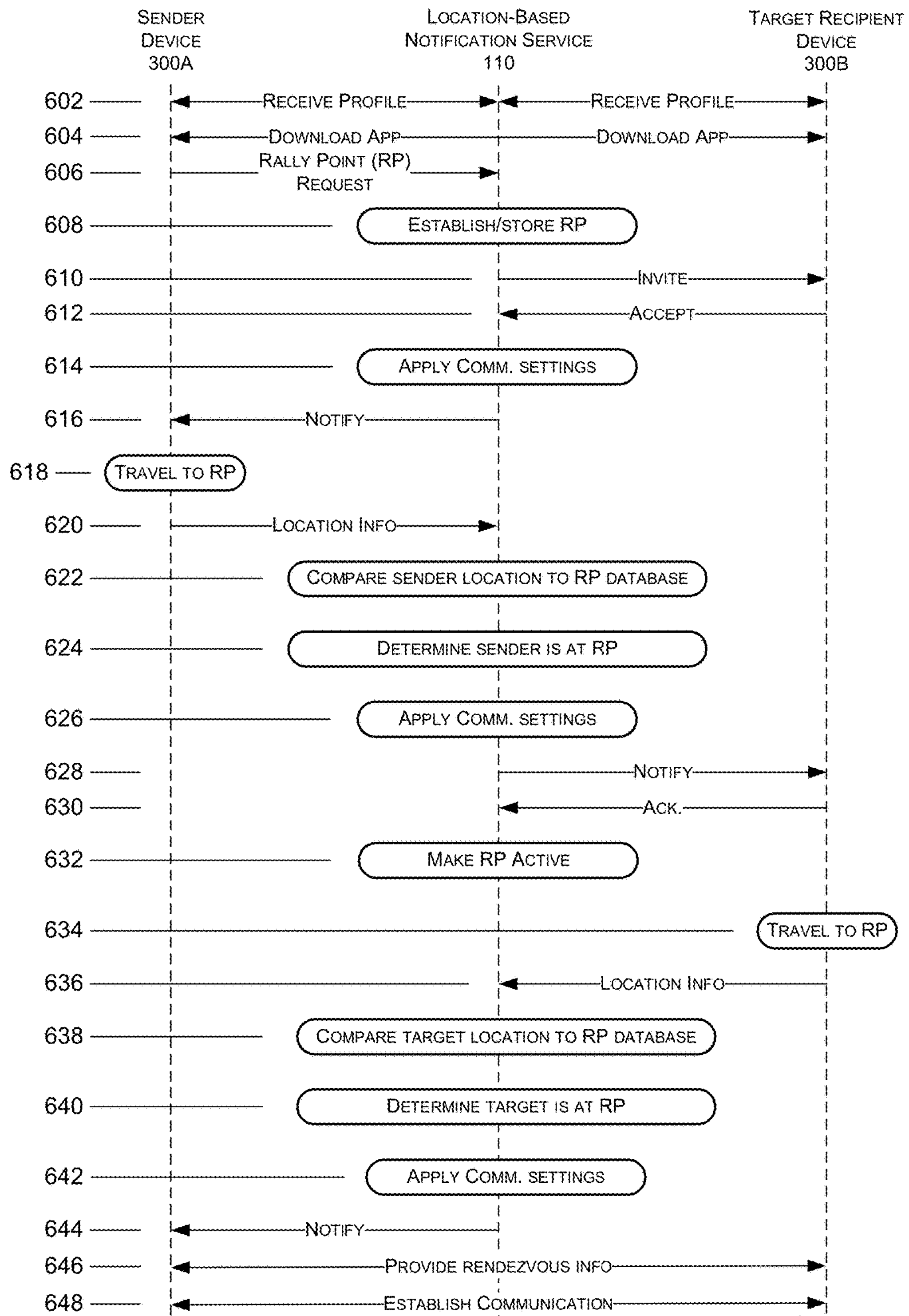
FIG. 6 is a system flow diagram showing illustrative processes usable by a sending device, a location-based notification service, and one or more target recipient devices to implement a location-based notification.

FIG. 6 is a system flow diagram showing an illustrative method 600 usable by a sending device, a location-based notification service, and one or more target recipient devices to implement a location-based notification. The method 600 may, but need not necessarily, be implemented using the client device 300 as sending target device 300A and target recipient device 300B, and using the location-based notification service 110.

In this particular implementation, the method 600 begins at 602 with receipt of user profiles from the sender device 300A and the target recipient device 300B by the location-based notification service. As noted above, these user profiles are typically populated and transmitted during initial creation of a user account, and may be updated anytime thereafter. The user profiles of the sender and the target recipient are shown as occurring simultaneously, but in practice the user profiles will typically be received sequentially. Also, as noted above, it is possible for a rally point to be established and a notification to be sent to a target recipient prior to the target recipient providing a user profile or even having created an account. In that case, the target recipient may be invited to create a user account along with a rally point invitation.

In the case of distributed embodiments (i.e., not purely web-based), in which at least some of the location-based notification functionality is performed at the client device side, a location-based notification service module 330 or application may, at 604, be downloaded to the sender device 300A and the target recipient device 300B. These client-side location-based notification modules 330 provide a font-end interface with the location-based notification service 110.

At 606, the location based notification service 110 receives a request to establish a rally point from the sender device 300A. As discussed above, the rally point request may include an identification of the sender, a location for the rally point, identification of one or more target recipients to be notified when the sender is at the rally point, a duration that the sender expects to stay at the rally point, one or more party members expected to be with the sender at the rally point, a boundary of the rally point, and/or a sensitivity of the rally point specifying an amount of time the sender is to be present at the rally point before a notification is sent.

At 608, the location based notification service 110 establishes a rally point based on the rally point request, and stores the rally point in the rally point database 418. Once the rally point is established, at 610, the notification module 426 of the location based notification service 110 sends a rally invitation to the target recipient device 300B and, at 612, receives an acceptance of the invitation.

Upon receiving acceptance of the invitation, at 614, the rules engine 424 of the location based notification service 110 queries the user profile database 416 to determine communication settings of the sender. At 616, the location based notification service 110 may notify the sender device 300A of the acceptance based on the sender's communication settings.

Subsequently, at 618, the sender travels to the rally point. At 620, the sender device 300A then communicates current location information of the sender device (automatically, semi-automatically, or manually) in accordance with location publication settings in the sender's user profile. The location based notification service 110 then, at 622, compares the current sender location to rally points stored in the rally point database 418, and, at 624, determines that the sender is at or en route to the rally point. When two rally points are near each other (or partially/completely overlapping), the location based notification service 110 can prompt and ask a sender which of the rally points the sender intends to activate. Additionally, a sender may specify a different rally point to activate in response to a semi-automatic notification (e.g., "publish" or "change rally point" may be the option).

A party may be determined to be en route to a rally point if they are subscribed to a rally point, travelling in the direction of the rally point location, and travelling outside of a common travel pattern (e.g., a predetermined distance or percentage of distance outside of a polygon formed by connecting the top X (e.g., 5) most frequently visited locations). In that case, the location based notification service 110 may prompt and ask the sender whether the sender is heading to the rally point. If the sender confirms that the rally point is the destination, the location based notification service 110 may notify the target recipients corresponding to the rally point. The location based notification service 110 may additionally provide information about the current location of the sender, the anticipated time of arrival, etc.

Next, at 626, the rules engine 424 of the location based notification service 110 queries the user profile database 416 to determine communication settings of the target recipient. At 628, the location based notification service 110 may notify the target recipient device 300B that the sender is at or en route to the rally point. Rally points may have active times. For example, a rally point may be set up that is only available during the weekends. Available times of the rally point may be used in determining whether and how to send an outgoing notification to the target recipient, and notifications may not be sent during non-available times.

The current location of the target recipient may be another factor in determining whether and how to send an outgoing notification to the target recipient. For example, if the target recipient is 30 minutes away from a rally point location, and the anticipated duration of the rally is 30 minutes, the location based notification service 110 may not provide a notification or provide the notification in a less attention demanding modality (e.g., send an email instead of making a phone call). The determination of the time gap between where a user is and where a rally is occurring may be based on estimated time of travel, estimated time based on past occurrences (e.g., if the target needs to pick his children up from daycare on Tuesday night, the location-based notification service 110 will include this time in determining whether to provide an outgoing notification), and/or other appointments on his or her calendar.

At 630, the target recipient may acknowledge receipt of the notification. At 632, the target recipient may begin traveling toward the rally point. Acknowledging receipt of the notification, traveling toward, or arriving at the rally point may cause the location based notification service 110 to, at 634, make the rally point active. Acknowledging receipt of the notification may take the form of, for example, responding affirmatively to a prompt, such as "Do you want to activate a Location X rally?" where X is the name of a rally point. At 636, the location based notification service 110 may receive location information from the target recipient device 300B (automatically, semi-automatically, or manually).

The location based notification service 110 then, at 638, compares the current target recipient location to the active rally point location stored in the rally point database 418, and, at 640, determines that the target recipient is at or en route to the rally point. Next, at 642, the rules engine 424 of the location based notification service 110 queries the user profile database 416 to determine communication settings of the sender. At 644, the location based notification service 110 may notify the sender device 300A that the target recipient is at or en route to the rally point.

Once a rally point is active, at 646, the location-based notification service 110 may facilitate sharing of rendezvous information between the sender device 300A and a target recipient device 300B to help the users locate one another at the rally point. Additionally or alternatively, the location-based notification service 110 may, at 648, establish a communication session between the sender device 300A and the target recipient device 300B to further aid the users in locating one another. The communication session may be initiated by the location-based notification service 110 prompting the sender to establish the call, prompting the target recipient to initiate the call, or by automatically initiating the call to both parties.

Illustrative Rally Proposal Process

Figure 7:
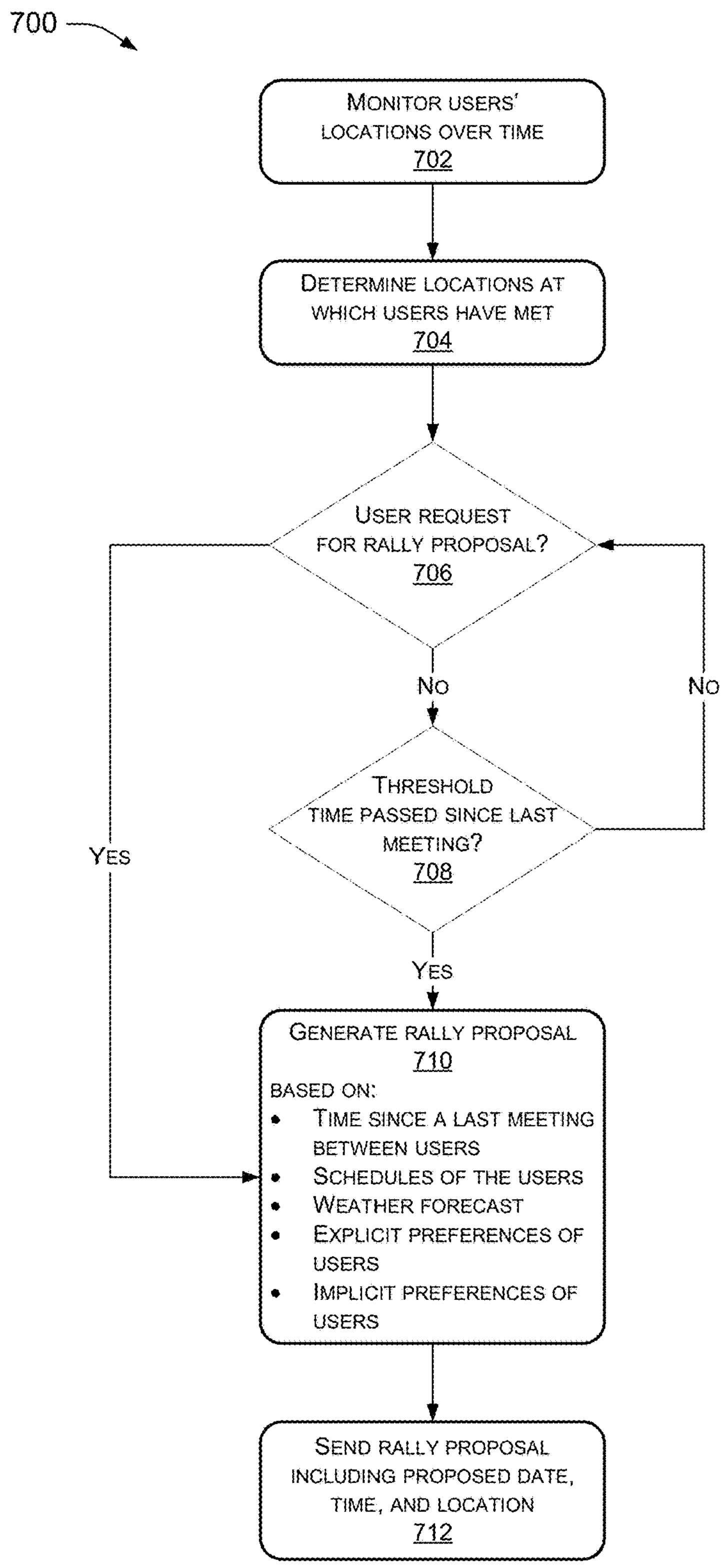
FIG. 7 is a flowchart showing an illustrative automated rally point proposal process.

FIG. 7 is a flowchart showing an illustrative rally point proposal method 700 that may be used to automatically propose a rally at a time in the future at a rally point where a group of people has met before. The method 700 may, but need not necessarily, be implemented using the location-based notification service 110.

According to one illustrative example, at 702, the location-based notification service 110 monitors multiple users' locations over time. At 704, the location-based notification service 110 determines locations at which the multiple users have met before. These previous meetings could be based in location histories of the users and/or histories of previous rallies attended by the users.

Proposed rallies can be initiated by a user or proposed by the location-based notification service 110 (e.g., on a periodic basis, after a certain amount of time has elapsed since two or more people have not met at a rally or otherwise, etc.). At 706, the method checks to see if a user has requested a rally proposal. If yes, the method proceeds to generate a rally proposal as described below. If not, the method proceeds, at 708, to check whether a predetermined time threshold has passed since a last meeting with the multiple users. If no, the method returns to operation 706 to check if a user has requested a rally proposal. If yes at 708, then the method proceeds, at 710, to generate a rally proposal taking into account a time that has passed since a last meeting of the multiple users, a weather forecast, schedules of the multiple users, locations of previous rallies or other meetings, explicit preferences of the users, implicit preferences of the users (based on rallies that a user has attended/declined), and the like.

Once the rally proposal has been generated, the rally proposal may be sent, at 712, to each of the parties according to their communication settings. The rally proposal may be accepted/subscribed-to just like any other invitation described herein, and parties may be notified when one or more of the parties is at or en route to the rally point in the same manner as other notifications described herein.

Illustrative Use Case

Figure 8:
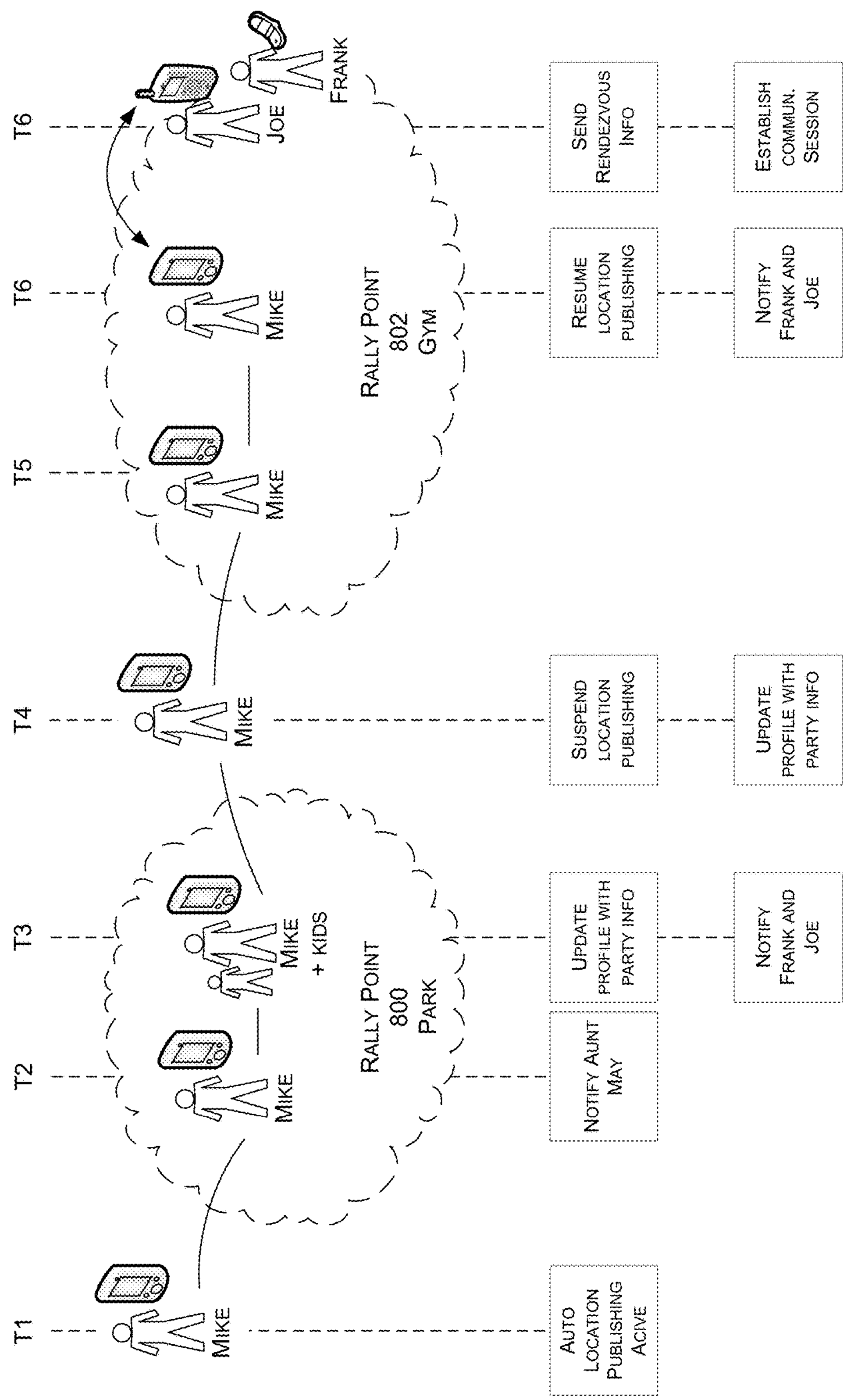
FIG. 8 is a schematic diagram of showing a series of actions of a user and corresponding illustrative actions performed by a location-based notification service in response to the actions of the user.

FIG. 8 is a schematic diagram of showing a series of actions of a user and corresponding illustrative actions performed by a location-based notification service in response to the actions of the user. FIG. 8 illustrates one example use case that highlights several of the features described above. In this scenario, a sender ("Mike") has previously established two rally points, a first rally point 800 at the park near his home, and a second rally point 802 at the gym where he works out. Mike, Aunt May, Joe, and Frank all subscribe to the location-based notification service 110, and all have user profiles stored in the system. Aunt May, Joe, and Frank have all subscribed to the first rally point 800, and Joe and Frank have both subscribed to the second rally point 802.

At T1, mike leaves work and heads for the park where he plans to meet his kids, Kate and Bill. Mike has automatic location publishing turned on, so his location is continuously being updated with the location-based notification service 110.

At time T2, Mike enters the park and arrives at the first rally point 800, where he plans to meet his kids. Upon Mike's arrival at the first rally point 800, an alert is posted to his profile in the location-based notification service 110. Aunt May, who has been watching the Mike's kids, receives a notification that Mike has arrived at the park, so she heads to the park to drop the kids off Joe is just sitting down to dinner, so he is probably not interested in this information and does not receive any type of notification. Frank's kids are good friends with Mike's kids, so Frank is interested in rallies at the park that include Mike's kids. Since Mike's kids are not yet with him, Frank also does not receive any notification at T2.

At T3, Aunt May arrives at the first rally point 800 and drops of Mike's kids Kate and Bill. Mike quickly updates his profile to change his party information to reflect that Kate and Bill are now with him Since Mike now has his kids with him, Frank is notified that Mike and his kids are at the park. Frank is on his way home with the kids. He has an hour to kill before dinner, so he decides to head to the park after he gets the automated call from the location-based notification service 110 informing him that Mike is at the park with his kids. After Frank arrives at the park, an alert is posted to his profile, and some of Frank's friends are notified. Also, because there are two of Joe's friends at the park now, the location-based notification service 110 sends Joe an email despite the fact that Joe is in the middle of dinner.

After about an hour, Mike and his kids leave the park and head home for dinner. After dinner, at T4, Mike suspends location publishing and updates his profile to show that his kids are no longer with him and heads to the gym to work out.

At T5, Mike arrives at the gym. Since Mike's location publishing feature is suspended, no one is notified that Mike is at the gym. After working out, Mike decides, at T6, that he would like to play a game of basketball, so he manually updates his location information by pressing a dedicated location publication control. Frank and Joe are promptly notified that Mike is at the gym, and both decide to meet Mike at the gym.

Upon arriving at the gym, at T7, the second rally point 802 becomes active and rendezvous information is shared between Mike and Joe's client devices. The rendezvous information indicates that Mike is in the gym, so Joe is able to more easily locate Mike. Further, Mike receives a notification when Joe and Frank arrive, which prompts Mike to initiate a communication session, which Mike does to ask Joe and Frank to bring him an extra towel and meet him at the basketball court.

Illustrative systems and methods of a location-based notification are described above. Certain features of the systems and acts of the methods need not be arranged in the order described, may be modified, and/or may be omitted entirely, depending on the circumstances. Also, any of the acts described above with respect to any method may be implemented by a processor or other computing device based on instructions stored on one or more computer-readable storage media.

CONCLUSION

Although the disclosure uses language specific to structural features and/or methodological acts, the invention is not limited to the specific features or acts described. Rather, the specific features and acts are disclosed as illustrative forms of implementing the invention.

What is claimed is:

1. A method implemented by one or more computing devices, the method comprising:

generating a proposal for a rally in response to receiving a request to establish a rally point from a user, the request including an identification of the user, respective identification of one or more other users, and a sensitivity of the rally point specifying an amount of time for a presence of the user or the one or more other users at the rally point before a notification is sent;

sending the proposal to the one or more other users based at least in part on communication modes that are specified in respective profiles of the one or more other users for receiving the proposal;

receiving an acceptance of at least one user of the one or more other users for the rally proposal;

establishing the rally point at least in part in response to receiving the acceptance of the at least one user; and storing information of the rally point in association with the location and the identification of the user and corresponding identification of the at least one user.

2. The method of claim 1, wherein the proposal comprises a proposed date and time, and a location for the rally point.

3. The method of claim 1, wherein generating the rally proposal comprises:

checking whether a predetermined time threshold has passed since the user and the one or more other users have last met; and initiating the proposal to the user.

4. The method of claim 1, further comprising receiving the respective user profiles from respective devices of the one or more other users.

5. The method of claim 1, wherein the communication modes comprises an email, a text message, a voice message or a multimedia message.

6. The method of claim 1, further comprising sending a notification indicating one of the user or the at least one user is at or en route to the rally point to the other of the user or the at least one user.

7. The method of claim 6, further comprising:
prompting the user to initiate a communication session with the at least one user;
prompting the at least one user to initiate the communication session with the user; or
automatically initiating the communication session between the user and the at least user.

8. One or more computer-readable hardware media storing executable instructions that, when executed by one or more processors, cause the one or more processors to perform acts comprising:
generating a proposal for a rally in response to receiving a request to establish a rally point from a user, the request including an identification of the user, respective identification of one or more other users, and a sensitivity of the rally point specifying an amount of time for a presence of the user or the one or more other users at the rally point before a notification is sent;
sending the proposal to the one or more other users based at least in part on communication modes that are specified in respective profiles of the one or more other users for receiving the proposal; receiving an acceptance of at least one user of the one or more other users for the rally proposal;
establishing the rally point at least in part in response to receiving the acceptance of the at least one user; and
storing information of the rally point in association with the location and the identification of the user and corresponding identification of the at least one user.

9. The one or more computer-readable hardware media of claim 8, wherein the proposal comprises a proposed date and time, and a location for the rally point.

10. The one or more computer-readable hardware media of claim 8, wherein generating the rally proposal comprises:
checking whether a predetermined time threshold has passed since the user and the one or more other users have last met;
and initiating the proposal to the user.

11. The one or more computer-readable hardware media of claim 8, the acts further comprising receiving the respective user profiles from respective devices of the one or more other users.

12. The one or more computer-readable hardware media of claim 8, wherein the communication modes comprises an email, a text message, a voice message or a multimedia message.

13. The one or more computer-readable hardware media of claim 8, the acts further comprising sending a notification indicating one of the user or the at least one user is at or en route to the rally point to the other of the user or the at least one user.

14. The one or more computer-readable hardware media of claim 13, the acts further comprising:
prompting the user to initiate a communication session with the at least one user;
prompting the at least one user to initiate the communication session with the user; or
automatically initiating the communication session between the user and the at least user.

15. A system comprising:
memory; and
one or more processors coupled to the memory to perform acts comprising:
generating a proposal for a rally in response to receiving a request to establish a rally point from a user, the request including an identification of the user, respective identification of one or more other users, and a sensitivity of the rally point specifying an amount of time for a presence of the user or the one or more other users at the rally point before a notification is sent;
sending the proposal to the one or more other users based at least in part on communication modes that are specified in respective profiles of the one or more other users for receiving the proposal;
receiving an acceptance of at least one user of the one or more other users for the rally proposal;
establishing the rally point at least in part in response to receiving the acceptance of the at least one user; and
storing information of the rally point in association with the location and the identification of the user and corresponding identification of the at least one user.

16. The system of claim 15, wherein generating the rally proposal comprises:
checking whether a predetermined time threshold has passed since the user and the one or more other users have last met; and
initiating the proposal to the user.

17. The system of claim 15, the acts further comprising receiving the respective user profiles from respective devices of the one or more other users.

18. The system of claim 15, wherein the communication modes comprises an email, a text message, a voice message or a multimedia message.

19. The system of claim 18, the acts further comprising sending a notification indicating one of the user or the at least one user is at or en route to the rally point to the other of the user or the at least one user.

20. The system of claim 19, the acts further comprising:
prompting the user to initiate a communication session with the at least one user;
prompting the at least one user to initiate the communication session with the user; or
automatically initiating the communication session between the user and the at least user.

* * * * *